United States Patent
Cannon et al.

(10) Patent No.: US 6,751,249 B1
(45) Date of Patent: Jun. 15, 2004

(54) RECEIVED-SIGNAL-STRENGTH-BASED SWAP TABLE FOR FREQUENCY HOPPING COMMUNICATION SYSTEM

(75) Inventors: Joseph M. Cannon, Harleysville, PA (US); Paul Joseph Davis, Wayne, PA (US); Richard Lawrence McDowell, Chalfont, PA (US); Jeffrey Paul Grundvig, Macungie, PA (US); Eric John Diethorn, Long Valley, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/405,910

(22) Filed: Sep. 24, 1999

(51) Int. Cl.[7] .............................. H04B 1/69; H04B 7/00; H04Q 7/00
(52) U.S. Cl. ........................ 375/133; 370/332; 375/295; 455/513
(58) Field of Search ................................. 375/132, 133, 375/295, 296, 260; 455/462, 62, 513, 464, 450, 452.1, 452; 370/328, 329, 332, 333, 335

(56) References Cited

U.S. PATENT DOCUMENTS

| | | | |
|---|---|---|---|
| 5,044,010 A | | 8/1991 | Frenkiel et al. ................ 379/61 |
| 5,159,678 A | * | 10/1992 | Wengelski et al. ........... 711/153 |
| 5,197,093 A | * | 3/1993 | Knuth et al. .................. 455/464 |
| 5,311,541 A | * | 5/1994 | Sanderford, Jr. ............. 375/131 |
| 5,323,447 A | | 6/1994 | Gillis et al. ..................... 379/61 |
| 5,463,659 A | | 10/1995 | Nealon et al. ................ 375/202 |
| 5,539,803 A | | 7/1996 | Bhat et al. ...................... 375/21 |
| 5,568,510 A | | 10/1996 | Tam ............................. 375/202 |
| 5,809,059 A | * | 9/1998 | Souissi et al. ................ 375/133 |
| 5,859,841 A | * | 1/1999 | Gitlits .......................... 370/335 |
| 5,884,145 A | * | 3/1999 | Haartsen ...................... 455/513 |
| 6,035,201 A | * | 3/2000 | Whitehead ................... 455/455 |
| 6,643,278 B1 | * | 11/2003 | Panasik et al. .............. 370/330 |

\* cited by examiner

Primary Examiner—Tesfaldet Bocure
(74) Attorney, Agent, or Firm—William H. Bollman

(57) ABSTRACT

A frequency hopping spread spectrum cordless telephone system which arranges a swap table. The method and apparatus scans the electromagnetic interference energy content of the frequencies listed in the swap table, for example, when the base unit and hand-held unit are not in use. A controller thereafter arranges the frequencies in the swap table according to their respective electromagnetic interference energy content. During normal operation, upon detection of a degraded active or hop frequency, the controller selects the swap frequency with the lowest electromagnetic interference energy content, which preferably is in the first position in the swap table, to replace the degraded hop frequency.

19 Claims, 3 Drawing Sheets

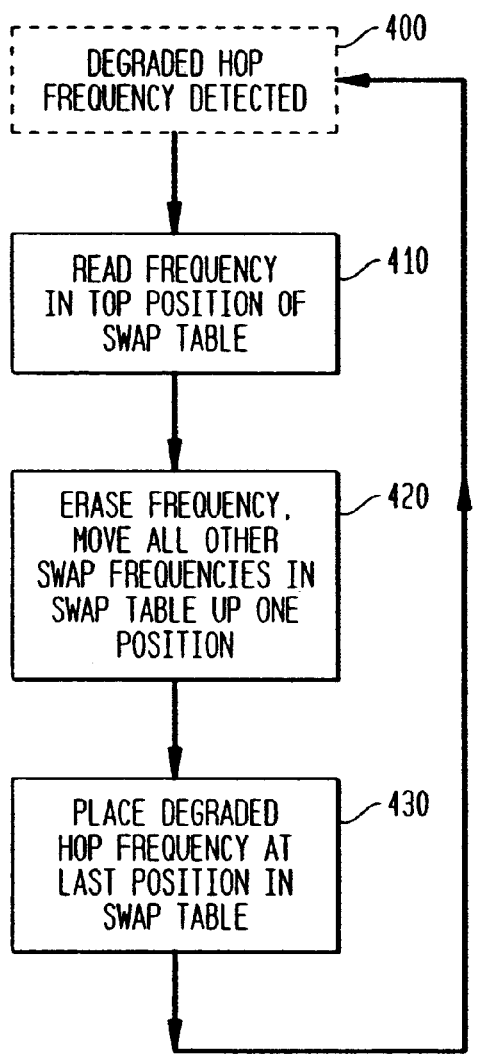

RECEIVED-SIGNAL-STRENGTH-BASED SWAP TABLE FOR FREQUENCY HOPPING COMMUNICATION SYSTEM

FIELD OF THE INVENTION

The present invention relates to cordless telephones and more particularly to a method for arranging the frequencies in a swap table of a cordless telephone.

BACKGROUND OF THE INVENTION

The use and demand for cordless telephone systems has greatly increased over the past several years. The expanding market for household digital cordless telephones has necessitated that engineers design more functional and efficient cordless units which meet consumer expectations of clarity and cost efficiency. The large increase in the number of users of these devices has, likewise, required that designers use bandwidth ever more efficiently in order to conserve available bandwidth resources.

A known method of using bandwidth efficiently in digital cordless telephone systems is through the use of frequency spread spectrum technology. This technology, which is also known as frequency hopping, establishes a communication path between a base unit and a hand-held unit of a cordless telephone system over multiple frequencies in non-overlapping units of time. By transmitting and receiving digital voice signals over different frequencies in this manner, any interference over any one particular frequency which may cause poor transmission on that frequency minimally effects the overall transmission when a sufficient number of frequencies are utilized and when frequencies are switched (or hopped) in relatively short intervals of time (e.g., <10 ms).

The spread spectrum frequency hopping method has been further improved through the use of swap frequencies. The frequencies which are available, but not designated as active hop table frequencies, are relegated to the swap table. However, hardware and cost constraints have generally restricted the number of frequencies available in cordless telephones, for example, even though such devices may be capable of hopping among many more frequencies. During operation of communication devices, when the system finds that a certain hop frequency experiences an inordinate amount of electromagnetic interference, that frequency is "swapped" for a pseudo-randomly selected frequency in the swap table. In this way, an attempt is made to minimize interference in the active hop table. According to this known method, however, the frequency selected from the swap table is randomly selected and therefore is unlikely to be the optimal frequency to select from among the frequencies in the swap table. It is possible that the frequency selected from the swap table to replace a degraded hop frequency in the prior art method may have a higher electromagnetic level than the rejected hop frequency itself.

Accordingly an apparatus and method are needed which optimally arrange and select a swap frequency so that electromagnetic energy in the selected channel is at a minimum so that a hop frequency experiencing interference can be replaced and the communication improved.

SUMMARY

In one aspect of the present invention, a method for arranging a set of frequencies assigned to a swap table in a cordless telephone comprises the steps of (i) identifying an electromagnetic energy level at each frequency in the set of swap frequencies; and (2) sorting the swap table frequencies in order of each frequency's respective electromagnetic energy level.

In another aspect of the invention another set of frequencies comprising a hop table is used in conjunction with the swap table frequencies such that when a hop frequency fails to meet a predetermined criterion: (1) that hop frequency is replaced by the swap frequency in the first position in the swap table and (2) the degraded hop frequency from the hop table is placed in the last position of the swap table.

In another aspect of the invention, a system for arranging the frequencies in a swap table of a cordless telephone according to each frequency's electromagnetic energy level is disclosed which comprises: (1) radio frequency reception circuitry which receives the electromagnetic energy of the swap frequencies; (2) a controller which determines the magnitude of the electromagnetic energy content of each of the frequencies assigned to the swap table (3) a memory storage which stores the swap table; and (4) a controller which arranges the frequencies in the swap table in order of the electromagnetic energy content of each of the swap frequencies.

BRIEF DESCRIPTION OF THE DRAWINGS

Other objects and features of the present invention will be described hereinafter in detail by way of certain preferred embodiments with reference to the accompanying drawings, in which:

FIG. 5 is a flowchart illustrating the method of replacing a degraded hop frequency with an optimal swap frequency using the cordless phone of FIG. 1 in accordance with the invention.

DETAILED DESCRIPTION OF THE PREFERRED EMBODIMENT

In accordance with the present invention and in furtherance of the known method of spread spectrum frequency hopping in digital cordless telephones, an apparatus and method disclosed wherein swap frequencies of a cordless telephone system are optimally arranged in a swap table to utilize bandwidth more efficiently. During idle periods of operation between the base unit and the hand-held unit of the cordless telephone, the system, comprising transmission, control and memory circuitry in the base unit, continually scans each of the swap frequencies and determines the value of the electromagnetic energy content of each swap frequency. Once the electromagnetic energy content of each swap frequency is known, the system arranges the swap frequencies in the swap table in ascending order of magnitude of each frequencies' respective electromagnetic energy content. In this manner, during active operation of the base unit and handset, when a swap frequency is needed to replace a degraded hop frequency, the swap frequency in the first position of the swap table will be the swap frequency with the lowest electromagnetic energy. Therefore, the swap frequency with the least interference on its channel is the swap frequency chosen to replace a degraded hop frequency.

Before proceeding with a detailed explanation of the method and apparatus of the present invention, a brief description of the known method of frequency hopping spread spectrum communications, as presently utilized in digital cordless telephone units, is appropriate.

Figure 1:
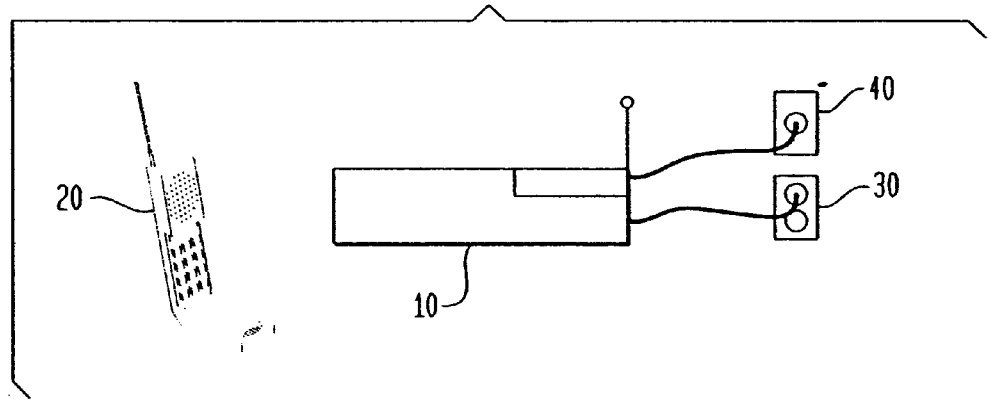
FIG. 1 represents a digital cordless telephone base unit and hand-held unit.

Turning to FIG. 1, a simple illustration of a cordless digital telephone base unit 10 and hand-held unit 20 are illustrated. The base unit 10 is powered by a connection to a wall outlet 30 and establishes a communication path to a common carrier voice network through, for example, an RJ-11 connection 40 (i.e., a modular jack).

Figure 2:
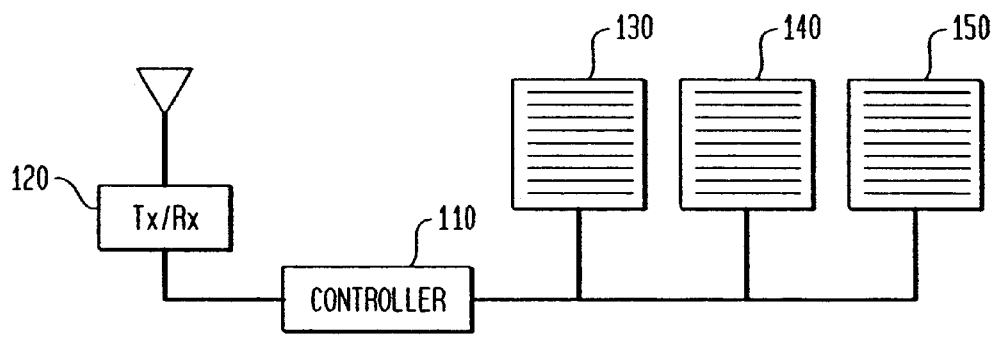
FIG. 2 represents an internal control and transmission circuitry arrangement for the base unit of FIG. 1 arranged to implement the present invention.

Both the base unit 10 and the hand-held unit 20 contain radio transceiver circuitry 120 through which communication is achieved, as illustrated in FIG. 2. The base unit additionally comprises control circuitry 110 in the form of a central processing unit (CPU), digital signal processor (DSP), or application specific integrated circuit (ASIC). The control circuitry is preferably integrated with memory units 130, 140, and 150 for use in cordless telephone operation. The memory units comprise memory in the form of conventional RAM, DRAM, etc. Alternately, the control circuitry is distributed between the base unit 10 and the hand-held unit 20 or is contained completely within the hand-held unit 20.

In digital cordless telephone systems, such as LUCENT TECHNOLOGIES' 9515 Digital Cordless Telephone, communications between the handset and the base unit are carried over a multiplicity of frequencies. In a time division multiplex system, the frequency currently being used by the hand-held unit 20 and base unit 10 to effectuate communication is time dependent. The handset and the base unit are synchronized and change carrier frequency in predetermined intervals (e.g., 5 ms.) to maintain a communication link. The frequencies involved in this process are known as hop frequencies, each of which is used by the base unit 10 and hand-held unit 20 to communicate over a discrete interval of time.

Hardware constraints have generally limited the number of hop frequencies to be fewer than the number of frequencies available for communications, even within FCC regulated bandwidth restrictions.

A listing of the hop frequencies available to the cordless phone is stored in an area of memory in the base unit 10 known as the hop table 130. A duplicate copy of the hop table 130 is preferably located in the hand-held unit 20. The hop table 130 is referenced by the controller 110 in order to set the transmission base frequency (or hop frequency) in the transmission circuitry 120 for communications with the hand-held unit 20 at any particular period of time.

Figure 3:
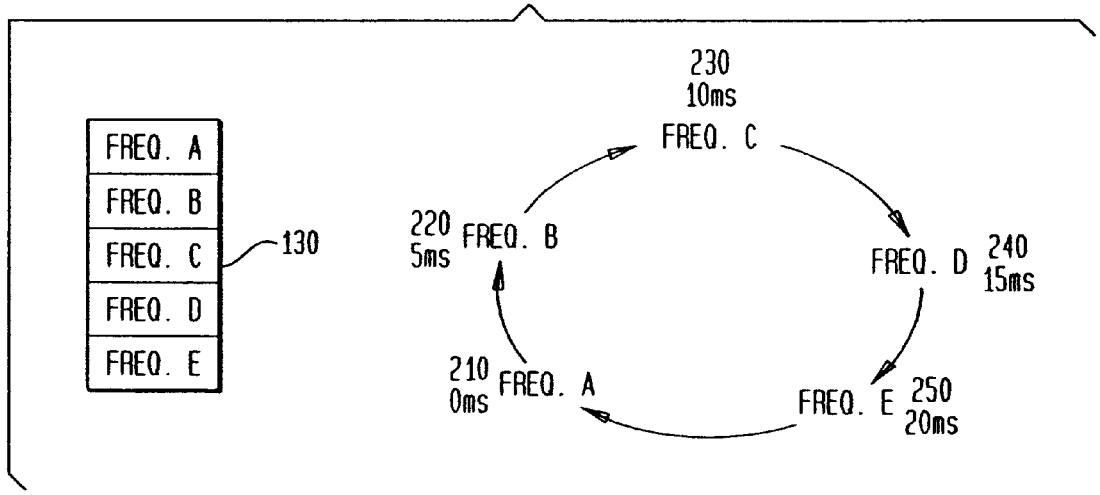
FIG. 3 is a logical representation of the process of frequency hopping.

FIG. 3 is a logical representation of the operation of the base unit and handset over the hop frequencies. For ease of illustration, only five hop frequencies are represented in the hop table 130. Present hardware technology allows for upward of approximately 25 frequencies to be used as hop frequencies in the 900 MHz range. The system represented in FIG. 3 hops, in a circular fashion, between five frequencies, A through E, every 5 ms. At step 210, the controller 110 of FIG. 2, reads the hop table 130 at time interval 0 msec. Frequency A being in the first position in the hop table 130, the controller 110 causes the base unit 10 and hand-held unit 20 to communicate over frequency A. Then, after 5 msecs. have passed at step 220, the base unit 10 and hand-held unit 20 communicate using frequency B, the next frequency in the hop table. This frequency hopping process continues in a circular manner as illustrated in FIG. 3, proceeding through steps 230, 240 and 250 and finally returning to step 210 to begin the hopping process anew. The exact frequencies chosen and the time interval used in the hop process are a matter of design chance and can be varied.

When communication is in progress as between the base unit 10 and the hand-held unit 20, the controller 110, working in conjunction with the transmission circuitry, continually monitors each of the hop frequencies to determine each hop frequency's respective level of electromagnetic energy. The level of electromagnetic energy at each hop frequency is compared to a predetermined threshold stored in an auxiliary memory unit 150. The controller 110 identifies hop frequencies which are experiencing inordinate amounts of interference, thus hampering the fidelity of the communication channel. In digital systems, the controller 110 utilizes a cyclical redundancy check (CRC), which is an indirect measure of the electromagnetic interference energy, to determine whether a hop frequency is degraded.

The number of active hop frequencies is hardware limited even though the system's transceiver circuitry 120 can transmit over more frequencies than it can hop. Accordingly, when the controller 110 identifies a hop frequency that has degraded due to interference on the channel, that frequency is replaced with an unused frequency which is available from a swap table 140 and within the range of frequencies that the transceiver circuitry is capable of utilizing. These standby frequencies are known as swap frequencies. A copy of the swap table 140 may likewise be stored in the hand-held unit 20. The swap frequencies are stored as a queue such that the frequency identified in the first location of the table is the frequency which will be selected to replace the next degraded hop frequency. The identity of the degraded hop frequency is thereafter written to the last position in the swap table such that the degraded hop frequency becomes a last resort "stand-by" swap frequency after all of the remaining swap frequencies have been used.

The general operation of spread spectrum frequency hopping as applied to cordless telephones is described in U.S. Pat. No. 5,568,510 of Tam, U.S. Pat. No. 5,463,659 of Nealon, et al., U.S. Pat. No. 5,323,447 of Gillis, et al., U.S. Pat. No. 5,539,803 of Bhat, et al. and U.S. Pat. No. 5,550,895 of Kyle, et. al., all of which are hereby incorporated by reference in their entirety herein.

In accordance with the present invention, the frequencies identified in the swap table 140 are arranged in accordance with a predetermined criterion. Specifically, they are arranged in order of increasing energy, with the lowest electromagnetic energy on top.

Figure 4:
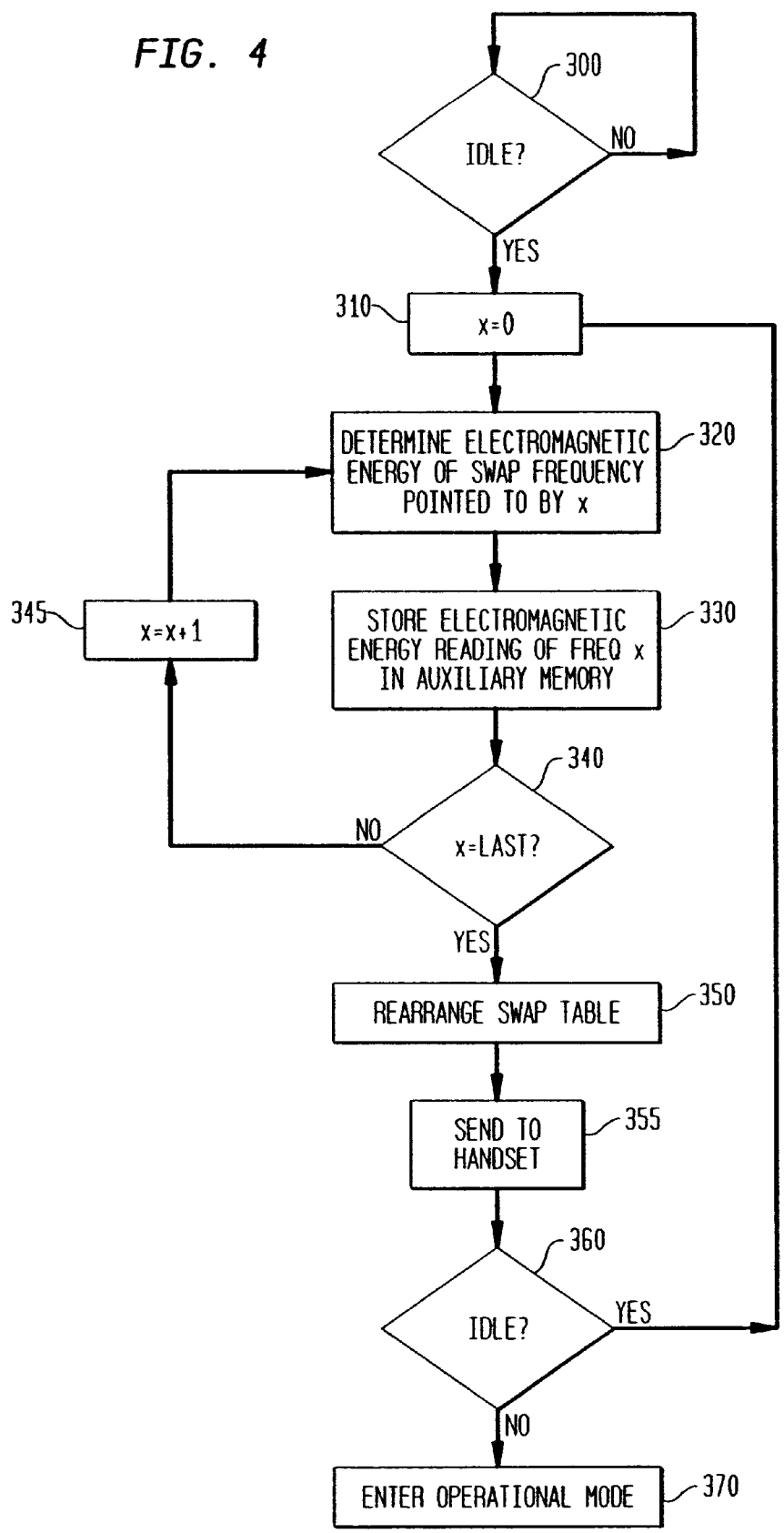
FIG. 4 is a flowchart illustrating the method of arranging swap frequencies in order of their respective electromagnetic energy levels using the cordless phone of FIG. 1 in accordance with the invention.

In FIG. 4, the method of the present invention is described in flow chart form. Any of the known methods of programming embedded systems, including digital cordless telephones, may be used to implement the method disclosed herein. The programmer or systems engineer is free to utilize any programming languages and programming conventions known in the art, including, but not limited to, high level languages (e.g., C/C++), hardware specific languages, or a combination thereof As shown in FIG. 4, during idle or stand-by periods of operation, when the base unit 10 and hand-held unit 20 of FIG. 1 are not communicating, the controller 110 continually scans and arranges all swap frequencies in order of their electromagnetic energy content. The process begins at step 300 where the controller 110 continually checks the system, waiting for the base unit 10 and hand-held unit 20 to go into an idle state, i.e., waiting for a user of the system to end his or her conversation.

Upon detection of an idle state, the controller 10 proceeds to step 310 where it sets a pointer, x, to 0. The pointer x points to a position in the swap table. The position pointed to by the pointer stores a certain swap frequency or, alternately may store a word that points elsewhere. The programmer is free to use any programming conventions known in the art. By initially setting the pointer x to 0 where 0 represents the first position of the swap table, pointer x points to the frequency resident in the first location of the swap table 140, i.e., the first channel frequency that will be selected by the controller 110 once a degraded hop frequency is detected. Of course, x, instead of being used as a pointer, can be set directly to the memory address of the first frequency. The programmer is free to use these or other programming conventions well known in the art.

At step 320, the controller 110 instructs the transceiver circuitry 120 to scan the swap frequency presently being pointed to by the pointer x. For example, if the pointer is set to 0, the controller 110 instructs the transceiver circuitry 120 to scan the frequency in the first position in the swap table 140 because the value of x, being 0, corresponds, in this example, to the first location of the swap table 140.

The transceiver circuitry 120 and the controller 110 operate together to perform any of the known methods for determining the level of electromagnetic interference existing over a channel (e.g., bit error rate or cyclical redundancy check for digital systems; or received signal strength indicator methods for analog systems, see LUCENT TECHNOLOGIES' U.S. Pat. No. 5,044,010, the entirety of which is hereby incorporated by reference herein). For example, the transceiver circuitry 120 and the controller 110 may analyze an instantaneous sample of the electromagnetic interference existing over the channel or may analyze an average of two or more samples of the electromagnetic interference existing over the channel.

Once the electromagnetic energy level of the swap frequency channel being pointed to by pointer x is determined, the controller 110 proceeds to step 330 and writes to auxiliary memory 150 the value of the electromagnetic energy level of the frequency resident in the position of the swap table 140 pointed to by x. With each value of electromagnetic energy written to auxiliary memory 150, a corresponding identifier is likewise stored in auxiliary memory 150 which identifies the swap frequency corresponding to the electromagnetic energy level written.

At step 340, the controller 110 reads the value of the pointer x and determines if it corresponds to the last position of the swap frequency table queue, i.e., to the last frequency in the swap table 140. If it is not the last position, the value of the pointer x is incremented by one and the controller 110 proceeds again to step 320 in order to determine the electromagnetic energy level of the frequency stored in the position of the swap table 140 presently being pointed to by the newly incremented pointer x.

If however, in step 340, the controller 110 determines that the pointer x is pointing to the last position in the swap table 140, the controller 110 progresses to step 350. At this point, the auxiliary memory 150 will contain the electromagnetic energy level readings of each of the swap frequencies listed in the swap table 140, along with identifiers corresponding to each swap frequency. The controller 110 therefore, simply arranges these readings by order of their magnitude of electromagnetic energy using a SORT or an equivalent command at step 350. Based on the resulting arrangement of the electromagnetic energy readings in auxiliary memory 150 and their corresponding identifier information correlating each reading with each hop frequency, the swap frequencies in the swap table 140 are rearranged, those swap frequencies with the lowest electromagnetic energy level being placed at the top of the table 140 or queue and those swap frequencies with the highest electromagnetic energy levels being placed at the bottom of the table 140 or queue. At step 355, the swap table 140 of the hand-held unit 20 is similarly re-arranged. In this way, during operational mode, when the controller 110 selects a swap frequency channel from the top of the swap table upon detecting a degraded hop frequency, the system is assured that the swap frequency selected is the optimal frequency selected in terms of electromagnetic energy level, at least as of the previous idle period when the relative electromagnetic energy levels were last measured.

After rearranging the swap table 140, the controller 110, at step 360, determines if the system is no longer idle, i.e., the controller 110 determines whether a user has activated the hand-held unit 20 in order to establish communications. If the system is no longer idle, the controller 110 enters operational mode at step 370 while the subroutine illustrated in FIG. 4 again awaits or listens at step 300 for the idle state to be entered so that the swap arrangement procedure can be repeated. If, however, the controller 110 determines, at step 360, that the system is still idle, the controller 110 returns to step 310 and may perform the swap table scan and rearrangement procedure again. In this way, when the phone is placed into an operational mode, the frequencies in the swap table will be as current as possible and arranged in an optimal order.

Although not shown in the flow chart of FIG. 4, following each step of the process, the controller 110 determines if the idle state has been terminated, i.e., the controller 110 checks the status of the base unit 10 and hand-held unit 20 for user activity. If activity is detected, the process illustrated terminates and returns to step 300. The swap table as presently arranged, i.e., according to the most recent completed arrangement is thereby utilized by the system. In this way, a user of the system need not wait for the process of FIG. 4 base unit 10 and hand-held unit 20 for telephone communications.

FIG. 5 illustrates the method of operation of the controller 110 and the swap table, arranged in conformance with the procedure of FIG. 4, during non-idle periods of operation. The process is initiated externally at step 400 by the detection of a degraded hop frequency. Once the controller 110 detects this degradation, it selects a swap frequency form the swap table to replace the degraded hop frequency. At step 410, the controller 110 selects the swap frequency in the first position of the swap table. An alternate way of understanding the selection is that the controller 110 'pops' the frequency from the top of the swap queue. Because the swap frequencies were arranged in order of energy level at step 350 (FIG. 4) with the lowest electromagnetic level frequencies on top, the frequency selected in the first swap table position or popped from the top of the swap queue will be the frequency with the lowest electromagnetic energy level.

Once the controller 110 has used the swap frequency selected at step 410 to cause the transceiver circuitry 120 to now utilize that frequency as a hop frequency, the controller 110 erases the frequency in the first position in the swap table and advances all of the other frequencies in the swap table by one address space. In this way, when the controller 110 again detects a degraded hop frequency, and thereafter select a swap frequency, the swap frequency in the first position will be the best available frequency in terms of existing electromagnetic interference. Of course, the frequency in the top position can be erased simply by writing each subsequent frequency over a prior frequency, or the pointers can simply be rearranged without any erasure of data.

At step 430, the controller 110 writes the degraded hop frequency that was replaced by the swap frequency to the last position in the swap table; i.e., to the bottom of the swap queue. In this way, the system is assured that this frequency will not be used to replace a subsequent degraded hop frequency until all of the other swap frequencies have first been utilized. The process thereafter returns to step 400 and waits for the detection by the controller 110 of another degraded hop frequency.

Although a preferred embodiment has been disclosed for illustrative purposes, those skilled in the art will appreciate that many additions, modifications and substitutions are possible without departing from the scope and spirit of the invention, which is defined solely by the accompanying claims.

What is claimed is:

1. A method of arranging a plurality of frequencies assigned to a swap table, each frequency corresponding to a communication channel, the swap table representing the order of channels to be allocated for communication, said method comprising the steps of:
    determining an electromagnetic interference energy level in the channel corresponding to each frequency in said set of frequencies;
    sorting said swap table of said frequencies in order of respective said electromagnetic interference energy level in corresponding channels during an idle period; and
    replacing a frequency in a hop table with a frequency in said swap table having a lowest level of interference as determined by said step of determining said electromagnetic energy level.

2. The method of claim 1, wherein said plurality of frequencies comprise a subset of frequencies in said swap table.

3. The method of claim 1, wherein said plurality of frequencies comprise all of the frequencies in said swap table.

4. The method claim 1, wherein said sorting step comprises arranging said table such that said frequencies are arranged in ascending order of electromagnetic interference energy levels.

5. The method of claim 1, wherein the received signal strength is used to represent the electromagnetic interference energy level at each frequency.

6. The method of claim 1, wherein the result of a cyclical redundancy check is used to indirectly represent the electromagnetic interference energy level at each frequency.

7. A method for arranging a set of frequencies assigned to a swap table, each frequency corresponding to a communication channel, the swap table representing the order of channels to be allocated for communication, wherein said frequencies in said swap table comprise a subset of predetermined frequencies, said swap table comprising any of a fixed number of frequencies arranged in ascending order of their respective electromagnetic interference energy content from said predetermined set of frequencies, and a hop table including all remaining frequencies from said set of predetermined frequencies, comprising the steps of:
    replacing, with a frequency in a first portion in said swap table, a frequency in said hop table which fails to meet predetermined criteria during an idle period; and
    removing said frequency from said hop table during said idle period which failed to meet said predetermined criteria and placing said frequency at the bottom of said swap table.

8. The method of claim 7, wherein said predetermined criteria comprises a predetermined electromagnetic interference energy level.

9. The method of claim 8, wherein said predetermined frequencies comprise communication channels between a cordless telephone base unit and a cordless telephone hand-held unit.

10. The method of claim 9, wherein said hop table and said swap table are housed in a memory unit disposed in at least one of said base unit and said hand-held unit.

11. The method of claim 10, wherein said steps of replacing and removing are performed in said memory unit.

12. A method for arranging a set of frequencies assigned to a swap table, each frequency corresponding to a communication channel, the swap table representing the order of channels to be allocated for communication, wherein said frequencies in said swap table comprise a subset of predetermined frequencies, said swap table comprising any of a fixed number of frequencies arranged in ascending order of their respective electromagnetic interference energy content from said predetermined set of frequencies, and a hop table including all remaining frequencies from said set of predetermined frequencies, comprising the steps of:
    replacing, with a frequency in a first portion in said swap table, a frequency in said hop table which fails to meet predetermined criteria; and
    removing said frequency from said hop table which failed to meet said predetermined criteria and placing said frequency at the bottom of said swap table;
    wherein said steps of replacing and removing are performed in a memory unit during idle periods when said base unit and said hand-held unit are not in use, said hop table and said swap table are housed in a memory unit disposed in at least one of said base unit and said hand-held unit, said predetermined frequencies comprise communication channels between a cordless telephone base unit and a cordless telephone hand-held unit, and said predetermined criteria comprises a predetermined electromagnetic interference energy level.

13. The method of claim 12, wherein said steps of replacing and removing are performed periodically during said idle period.

14. A system for arranging a set of frequencies assigned to a swap table, each frequency corresponding to a communication channel, the swap table representing an order to be allocated for communication, said system comprising:
    radio frequency transceiver circuitry which is capable of transmitting and receiving at frequencies assigned to a hop table previously obtained from said swap table;
    a sensor which determines a magnitude of electromagnetic interference energy content of each of said frequencies assigned to said swap table;
    a memory storage unit which stores said swap table; and
    a controller which arranges said frequencies in said swap table in order of an amount of electromagnetic interference energy of each of said swap frequencies;
    wherein said controller is adapted to remove a frequency from said hop table upon failure to meet a predetermined criteria, and to place said removed frequency in said swap table.

15. The system of claim 14, wherein said transceiver circuitry, controller and memory storage unit are contained in at least one of a cordless telephone base unit and a cordless telephone hand-held unit.

16. A system for arranging a set of frequencies assigned to a swap table, each frequency corresponding to a communication channel, the swap table representing the order of channels to be allocated for communication, said system comprising:

radio frequency transceiver circuitry which transmits and receives electromagnetic interference energy of said frequencies assigned to said swap table;

a sensor which determines the magnitude of the electromagnetic interference energy of said frequencies assigned to said swap table;

a memory storage unit which stores said swap table and a set of hop frequencies;

a controller which arranges said frequencies in said swap table in order of the electromagnetic interference energy content of each of said swap frequencies;

a pointer, said pointer pointing to a swap frequency with the lowest electromagnetic interference energy content as determined by said controller and said pointer being responsive to an indication by said controller of a degraded hop frequency thereby causing said pointer to point to the swap frequency comprising the next lowest electromagnetic interference energy content; and a controller which substitutes a hop frequency in said hop table which fails to meet predetermined criteria with the swap frequency being pointed to by said pointer.

17. The system of claim 16, wherein said predetermined criteria comprises a predetermined electromagnetic interference energy level.

18. The system of claim 16, wherein the value of said predetermined criteria is stored in said memory storage unit.

19. The system of claim 16, wherein said memory storage unit and said pointer are contained in at least one of a cordless telephone base unit and a cordless telephone hand-held unit.

* * * * *